April 18, 1939.　　　M. A. GIBBONS　　　2,155,124
VALVE UNIT
Filed March 9, 1937　　　2 Sheets-Sheet 1
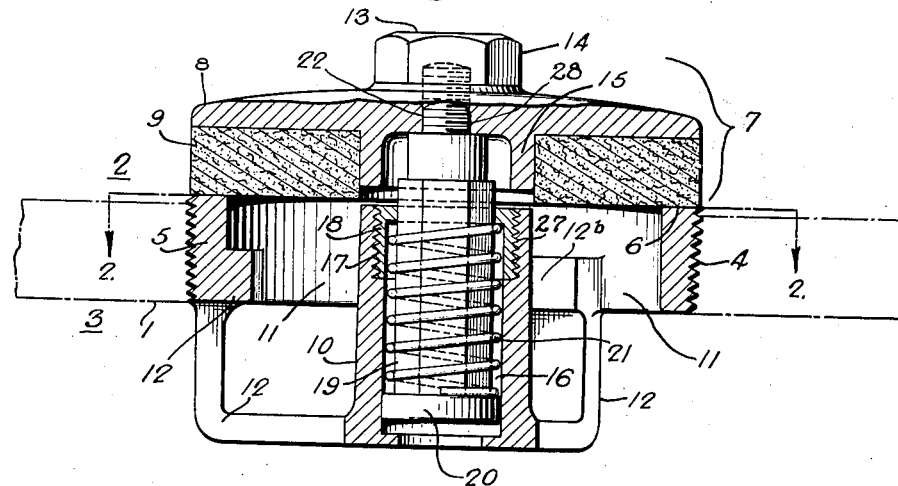
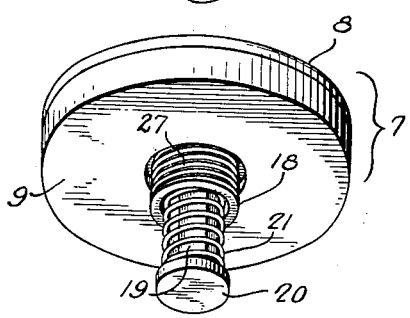
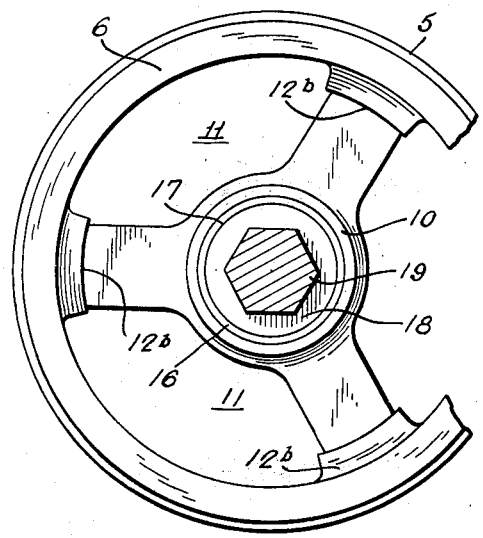
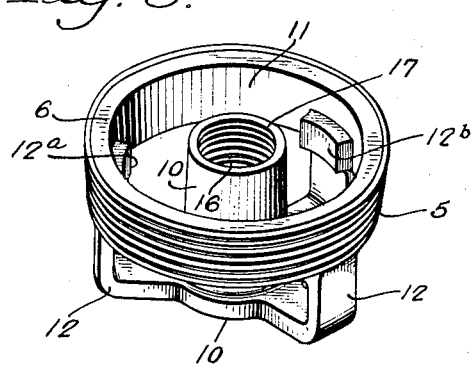
Inventor:
Michael A. Gibbons
by his Attorneys
Howson & Howson

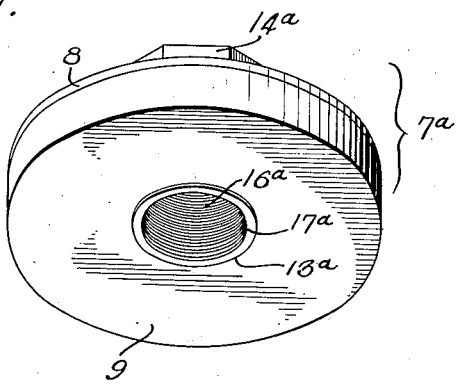
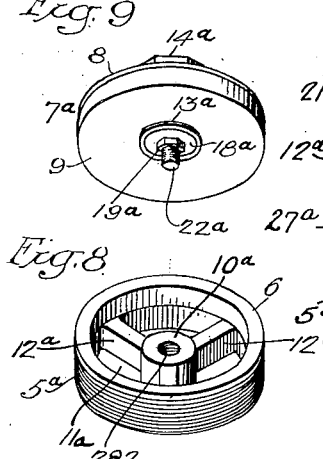
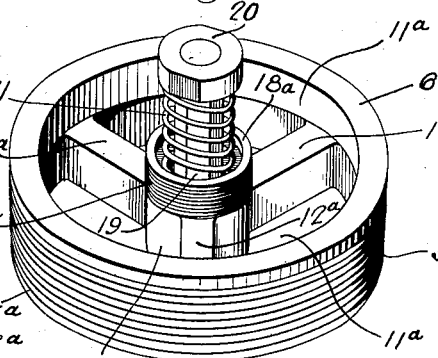
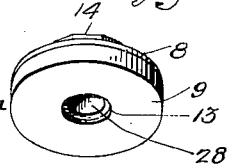
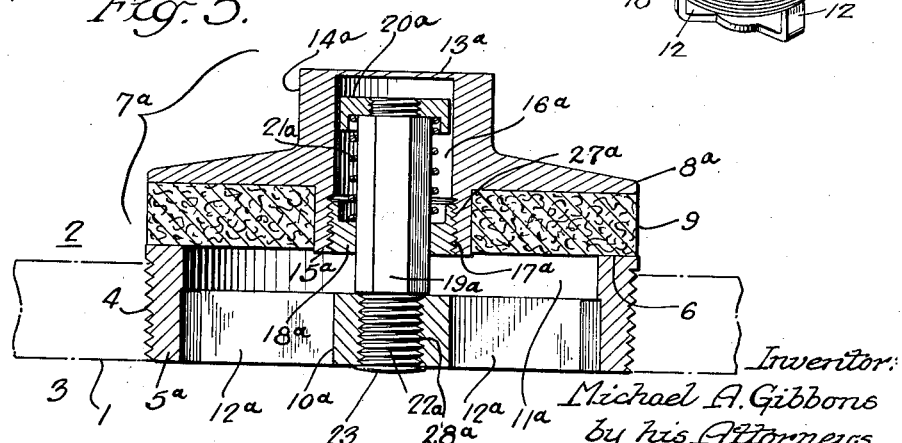

Patented Apr. 18, 1939

2,155,124

UNITED STATES PATENT OFFICE 2,155,124

VALVE UNIT

Michael A. Gibbons, Philadelphia, Pa.

Application March 9, 1937, Serial No. 129,936

6 Claims. (Cl. 251—144)

This invention relates to a valve unit for use in hydraulic or pneumatic pumps, tanks, pipe lines, etc. or in any instance where a flow of liquid or gaseous fluid is to be permitted in one direction and checked against back flow in the opposite direction.

The valve unit disclosed in the present application constitutes an improvement over the valve unit disclosed in my copending application, Serial No. 79,584, filed May 13, 1936.

The objects of the present invention correspond to those recited in the above noted copending application, with the additional object directed to further simplification of the structure to facilitate further the mounting and assembling of the valve unit in pump chambers and other places where restricted access to the valve chamber prevails.

Another object of the invention is to reduce the overall axial dimension of the valve unit to increase the valve lift and to enable the valve unit to be more readily assembled in places where the overhead valve clearance is extremely limited.

In the accompanying drawings:

Fig. 1 depicts a longitudinal sectional elevation of a valve unit comprising improvements over the unit disclosed in the above mentioned copending application;

Fig. 2 is a transverse sectional elevation taken on the line 2—2, Fig. 1;

Fig. 3 is a detached perspective view of the base element of the valve unit shown in Fig. 1;

Fig. 4 is a detached perspective view of the movable valve element of the unit shown in Fig. 1;

Fig. 5 is a view similar to Fig. 1, depicting the preferred form of the present invention;

Fig. 6 is a detached perspective view of the base element of the valve unit shown in Fig. 5;

Fig. 7 is a detached perspective view of the movable valve element shown in Fig. 5;

Figs. 8 and 9 are views similar to Figs. 6 and 7 respectively; and

Figs. 10 and 11 are views similar to Figs. 3 and 4 respectively.

Similar reference characters indicate similar parts in the different forms of the invention shown in the drawings and where modifications are made to any of such parts in the form shown in Figs. 5 to 9 inclusive over the form shown in Figs. 1 to 4, 10 and 11 such modified parts are noted by the subscript *a*.

In Figs. 1 and 5, the reference character 1 represents a rigid division wall between two chambers 2 and 3 such as are found in the head of a pump, or in a valve housing in a pipe line, etc. In some instances, the wall 1 may constitute a side, bottom or top wall of a tank or other receptacle through which it is desired to control flow into or out of the receptacle or to relieve pressure within the tank or receptacle when it is of a closed type.

The wall 1 is provided with a threaded opening 4, in the present instance, in which the valve unit of the present invention is adapted to be installed.

In the present case, the valve unit comprises a tapered externally threaded base element or ring 5 or 5a which is adapted to be screwed into the tapered threaded opening 4 of the wall 1 and to be drawn down sufficiently tight therein to form a fluid seal therebetween. One end or face of the ring or base element 5 or 5a is provided with a valve seat 6 which may be finished in any usual manner, such as by grinding, etc.

Arranged to rest on the valve seat 6 is a movable valve element 7 or 7a. In the present instance, each of the movable valve elements 7 and 7a includes a substantially flat metallic main or backing disk 8 or 8a. Secured to the under side of the backing disk is a sealing disk or ring 9 which is composed of fibre or any of the other well known materials commonly used for such purposes. The disk or ring 9 may be secured to the inner surface of the main or backing disk in any suitable or well known manner, such for example as by water or acid-proof cement, screws, clamp rings, etc. In some instances, the sealing disk 9 may be dispensed with and the seal formed by grinding or otherwise finishing the underside of the main disk to provide a sealing contact between the disk and the seat 6.

Each of the base elements 5 and 5a is provided with a central portion or member indicated at 10 in Fig. 1 and 10a in Fig. 5 which is disposed in or in axial alignment with the ring 5 or 5a and its fluid port opening 11, 11a. The central members 10 and 10a are supported by means of arms 12, 12 and 12a, 12a respectively which are formed integral with the rings 5, 5a and central members 10, 10a and extend radially therebetween in a manner to provide for a substantially unobstructed flow through the port openings 11, 11a of the rings 5 and 5a respectively.

Each of the movable valve elements 7 and 7a includes a central portion or member 13, 13a which comprises an outwardly projecting hexagonal or other suitably shaped protuberance 14, 14a which extends axially a suitable distance beyond the outer surface of the main or backing disk 8 or 8a to receive a suitable wrench or other tool by which the valve element 7 or 7a as the case may be is bodily rotated, for purposes hereinafter described.

The central portions or members 13 and 13a of the movable valve elements 7 and 7a respectively each includes an inwardly projecting protuberance 15 or 15a which extends from the opposite or inner surface of the backing disk, through an axial opening formed in the sealing disk 9.

In that form of the invention disclosed in Figs.

1 to 4 inclusive, the central member 10 of the base element 5 is provided with an axially extending cavity 16, while in that form of the invention shown in Figs. 5, 6 and 7, the central member 13a of the movable valve element 7a is provided with an axial cavity 16a. In each instance, one end of the axial cavity is open and provided with internal threads 17, 17a for the reception of external threads 27 or 27a formed on an abutment ring 18 or 18a.

Each of the abutment rings 18 and 18a is splined to a stud 19, or 19a, whereby the abutment ring is permitted sliding movement longitudinally on and relative to said stud but is prevented from rotating relative to said stud. The splined connection, in the present instance, is formed by the stud being hexagonal in cross section and the abutment being provided with a stud-receiving opening of corresponding shape.

One end of the stud 19 or 19a, in each instance, projects into the axial cavity 16 or 16a, as the case may be, and is provided at its projecting end with a relatively fixed abutment 20 or 20a.

When forcible closing of the valve is desired the stud 19 or 19a, between the abutments 18 and 20 or 18a and 20a, is provided with a spring 21 or 21a which tends to move the two abutments apart for seating the sealing ring 9 firmly on the valve seat 6.

In that form of the invention shown in Fig. 1, the stud 19, at its end opposite to that upon which the abutment 20 is formed, is reduced in diameter and threaded as indicated at 22, the threaded end 22 of said stud being screwed into a tapped opening formed in the central portion 13 of the movable valve element 7. The abutment ring 18, in this instance, is threaded into the threaded open end of the axial cavity 16 of the central member 10 of the base element 5. In this instance, the spring 21, acting against the abutment 18 and bearing against the abutment 20 of the stud 19, moves the stud 19 longitudinally through and relative to the ring 18 and thereby moves the movable valve element 7 until the sealing disk 9 is firmly seated on the valve seat 6 of the base element or ring 5.

In that form of the invention shown in Figs. 5, 6 and 7, the reduced threaded end 22a of the stud 19a is screwed into a tapped opening formed in the central member 10a of the base element 5a. If desired, the stud may be held against removal by riveting or upsetting the end 23 of the reduced threaded portion 22a of the stud, to prevent the threaded portion 22a from backing out of the central member 10a of the base element 5. In this instance, the abutment 18a is threaded into the open end of the axial cavity 16a formed in the central member or portion 13a of the movable valve element 7a. In this instance, the spring 21a acting against the abutment 20a and the abutment 18a moves the valve element 7a longitudinally of the stud 19a until the sealing disk 9 is seated on the valve seat 6.

It will be noted that, in each instance, the construction is such that no leakage from the chamber 3 to the chamber 2 or vice versa, around the stud 19, 19a is possible, as there is no possibility of fluid passing through the valve element 7 or 7a due to the integrally closed nature of the backing disk 8 or 8a and its protuberance 14, 14a thereon, no threaded joints or other meeting of assembled parts being present which might become loose and permit leakage of fluid from one to the other of the chambers 2 and 3, the only communication between said chambers being by raising the valve element 7 or 7a until the sealing disk 9 thereof is raised off the valve seat 6 of the base element 5 or 5a.

The valve unit is adapted to be mounted and assembled in the opening 4 in the wall 1 in the following manner:

With the two elements 5, 5a and 7, 7a of the valve unit separated, as indicated in Figs. 3 and 4 and in Figs. 6 and 7, the base element 5 or 5a is threaded into the tapped opening 4 of the wall 1 and tightened therein by means of a spanner wrench or other suitable tool fitting within the openings 11, 11a of the element 5, 5a and engaging the arms 12, 12a or lugs 12b which latter, as indicated in Figs. 1 and 3, are formed on the ring 5 within the opening 11 and project a slight distance inwardly toward the central member 10.

It will be noted in that form of the invention shown in Figs. 1 to 4 inclusive that the stud 19 with its fixed abutment 20 thereon and with the movable abutment 18 and spring 21 between the said abutments is carried entirely by the movable valve element 7. After the base element 5 is tightened, the movable valve element 7 is placed over the base element 5. The stud 19 enters the open end of the axial cavity 16 in the central member 10 of the base element 5. By rotating the valve element 7 bodily the external threads 27 on the abutment 18 engage with the internal threads 17 at the open end of the cavity 16. Continued rotation of the valve element 7 runs the abutment 18 down into the cavity 16. Final tightening of the abutment sleeve 18 is then effected by a suitable tool engaging with the protuberance 14 on said valve element. The valve unit is then completely assembled and ready for operation as depicted in Fig. 1.

It will be noted upon referring to Figs. 6 and 7 of the drawings that in that form of the invention shown in Figs. 5 to 7 inclusive, the stud 19a with its fixed abutment 20a, movable abutment sleeve 18a and spring 21a therebetween are rigidly secured to the base element 5a, prior to the application of the element 5a to the threaded opening 4 in the wall 1.

After the base element 5a is tightened, in the manner above noted, in the wall 1, the movable valve element 7a is then placed over the base element 5a and the upper end of the stud 19a on which the fixed abutment 20a is mounted enters the open threaded end of the axial cavity 16a in the central member 13a of said valve element 7a. This brings the external threads 27a of the movable abutment 18a into engagement with the threads 17a of the valve element 7a. Bodily rotation of the valve element 7a causes the abutment 18a to move into the cavity 16a compressing the spring 21a between abutments 18a and 20a. The abutment ring 18a is then jammed tightly in the open end of the cavity 16a by further rotation of the valve element 7a by means of a suitable tool applied to the protuberance 14a on the valve element 7a. The valve unit is then completely assembled ready for operation as indicated clearly in Fig. 5.

It will be noted that while both forms of the invention disclosed in the present application constitute an improvement over the valve unit disclosed in the above noted copending application, particularly from the viewpoint of assembling the valve unit after the base element has been secured in place in the wall 1, the form of the invention shown in Figs. 5, 6 and 7 constitutes a still further improvement over the form shown in Figs. 1 to 4 inclusive and is, therefore, considered to be the preferred form of the invention.

Figs. 8 and 9 show another way of assembling the valve unit of Fig. 5 after the base element 5a has been "set" in the wall 1. In this instance, the stud 19a, spring 21a and abutment ring 18a are first assembled in the axial cavity 16a of the movable valve element 7a, with only the threaded end 22a of the stud 19a protruding as in Fig. 9. The threaded end 22a of the stud 19a is then entered and screwed into the threaded opening 28a in the central member 10a of the base element 5a and subsequently tightened to hold the stud rigidly in the base element 5a by a wrench applied to the protuberance 14a of the movable element 7a.

Figs. 10 and 11 show another way of assembling the valve unit of Fig. 1 after the base element 5 has been tightened in the wall 1. In this case, the stud 19, spring 21 and abutment 18 are assembled in the axial cavity 16 of the central member 10 of the base element 5 with only the threaded end 22 of the stud protruding as in Fig. 10. The threaded end 22 of the stud 19 is then entered and screwed into the threaded opening 28 in the central member 13 of the movable valve element 7 and subsequently tightened to hold the stud 19 rigidly in the valve element 7 by a wrench applied to the protuberance 14 of the movable valve element 7.

In either case, the wrench applied to the protuberance 14 or 14a and turning the movable valve element 7 or 7a tightens the stud 19 or 19a and ring 18 or 18a against accidental backing out of the threaded openings in which they are secured.

I claim:

1. A valve unit comprising a base element provided with a fluid port, a valve seat surrounding said port, a central member axially disposed in said port and rigidly connected to said base element, a movable valve element arranged to engage said seat to close said port and including a central member axially aligned with the central member of said base element, a stud having one end rigidly secured in one of said central members and its opposite end projecting therefrom into an open end of an axial cavity formed in the other of said central members, a relatively fixed abutment on the projecting end of said stud, and a relatively movable abutment slidably mounted on and splined to said stud and threaded into said open end of said axial cavity.

2. A valve unit comprising a base element provided with a fluid port, a valve seat surrounding said port, a central member axially disposed in said port and rigidly connected to said base element, a movable valve element arranged to engage said seat to close said port and including a central member axially aligned with the central member of said base element, a stud having one end rigidly secured in one of said central members and its opposite end projecting therefrom into an open end of an axial cavity formed in the other of said central members, a relatively fixed abutment on the projecting end of said stud, a relatively movable abutment slidably mounted on and splined to said stud and threaded into said open end of said axial cavity, and a spring encircling said stud intermediate said abutments for seating said movable valve element on the seat of said base element.

3. A valve unit comprising a base element provided with a fluid port, a valve seat surrounding said port, a central member axially disposed in said port and rigidly connected to said base element, a movable valve element arranged to engage said seat to close said port and including a central member axially aligned with the central member of said base element, a stud having one end rigidly secured in one of said central members and its opposite end projecting therefrom into an open end of an axial cavity formed in the other of said central members, a relatively fixed abutment on the projecting end of said stud, a relatively movable abutment slidably mounted on and splined to said stud and threaded into said open end of said axial cavity, and said movable valve element being integrally closed over its entire area on the face thereof opposite to that which engages said valve seat.

4. A valve unit comprising a base element provided with a fluid port, a valve seat surrounding said port, a central member axially disposed in said port and rigidly connected to said base element, a movable valve element arranged to engage said seat to close said port and including a central member axially aligned with the central member of said base element, a stud having one end rigidly secured in one of said central members and its opposite end projecting therefrom into an open end of an axial cavity formed in the other of said central members, a relatively fixed abutment on the projecting end of said stud, a relatively movable abutment slidably mounted on and splined to said stud and threaded into said open end of said axial cavity, said movable valve element being integrally closed over its entire area on the face thereof opposite to that which engages said valve seat, and said closed face of said movable valve element being provided with means by which said movable valve element may be rotated bodily to effect securing of said movable abutment in said open end of said axial cavity.

5. A valve unit comprising a base element provided with a fluid port, a valve seat surrounding said port, a central member axially disposed in said port and rigidly connected to said base element, a movable valve element arranged to engage said seat to close said port and including a central member axially aligned with the central member of said base element, a stud having one end rigidly secured in the central member of said base element and its opposite end projecting into an open end of an axial cavity formed in the central member of said movable valve element, a relatively fixed abutment on the projecting end of said stud, and a relatively movable abutment slidably mounted on and splined to said stud and threaded into said open end of said axial cavity in said movable valve element.

6. A valve unit comprising a base element provided with a fluid port, a valve seat surrounding said port, a central member axially disposed in said port and rigidly connected to said base element, a movable valve element arranged to engage said seat to close said port and including a central member axially aligned with the central member of said base element, a stud having one end rigidly secured in the central member of said movable valve element and its opposite end projecting into an open end of an axial cavity formed in said central member of said base element, a relatively fixed abutment on the projecting end of said stud, and a relatively movable abutment slidably mounted on and splined to said stud and threaded into said open end of said axial cavity in said base element.

MICHAEL A. GIBBONS.